United States Patent
Furukawa et al.

(10) Patent No.: US 7,485,680 B2
(45) Date of Patent: Feb. 3, 2009

(54) PROCESS FOR PRODUCING RUBBERY POLYMER PARTICLE AND PROCESS FOR PRODUCING RESIN COMPOSITION CONTAINING THE SAME

(75) Inventors: Ryuji Furukawa, Takasago (JP);
Masakuni Ueno, Takasago (JP);
Katsumi Yamaguchi, Takasago (JP);
Chiho Yoshimi, Takasago (JP);
Yoshihiro Ikeda, Takasago (JP)

(73) Assignee: Kaneka Corporation, Osaka (JP)

(*) Notice: Subject to any disclaimer, the term of this patent is extended or adjusted under 35 U.S.C. 154(b) by 345 days.

(21) Appl. No.: 10/571,068

(22) PCT Filed: Sep. 1, 2004

(86) PCT No.: PCT/JP2004/013017

§ 371 (c)(1),
(2), (4) Date: Mar. 8, 2006

(87) PCT Pub. No.: WO2005/028546

PCT Pub. Date: Mar. 31, 2005

(65) Prior Publication Data

US 2007/0027263 A1 Feb. 1, 2007

(30) Foreign Application Priority Data

Sep. 18, 2003 (JP) ............................. 2003-326711
Mar. 8, 2004 (JP) ............................. 2004-063696

(51) Int. Cl.
*C08F 271/00* (2006.01)
*C08F 279/00* (2006.01)
*C08L 51/00* (2006.01)
*C08L 51/02* (2006.01)

(52) U.S. Cl. ........................ 524/558; 524/560; 524/562; 525/65; 525/66; 525/68; 525/282; 525/293; 525/308

(58) Field of Classification Search .................. None
See application file for complete search history.

(56) References Cited

U.S. PATENT DOCUMENTS 4,778,851 A * 10/1988 Henton et al. ................. 525/65
4,840,991 A * 6/1989 Sekmakas .................... 524/812
2007/0027233 A1* 2/2007 Yamaguchi et al. ......... 523/467

FOREIGN PATENT DOCUMENTS

| JP | 02-026716 | | 1/1990 |
| JP | 3-26716 A | * | 2/1991 |
| JP | 04-093340 | | 3/1992 |
| JP | 2002-30122 A | * | 1/2002 |
| WO | WO 03/022891 A1 | * | 3/2003 |

* cited by examiner

*Primary Examiner*—Robert Sellers
(74) *Attorney, Agent, or Firm*—Kenyon & Kenyon LLP

(57) ABSTRACT

A process for efficiently producing an agglomerate resulting from removal of impurities from a water-base latex of rubbery polymer particles or dry Powder thereof and producing a dispersion having rubbery polymer particles dispersed in an organic solvent, and a process for efficiently producing a resin composition of low impurity content, in which the state of dispersion of rubbery polymer particles is excellent, from the above dispersion. In particular, a rubbery polymer particle agglomerate of low impurity content is obtained by first mixing a water-base latex of rubbery polymer particles with an organic solvent exhibiting partial solubility in water, bringing the resultant mixture into contact with water to thereby form a rubbery polymer particle agglomerate, and thereafter separating the water phase from the agglomerate/water phase mixture. Further, a resin composition of low impurity content having rubbe, polymer particles favorably dispersed is obtained by first adding an organic solvent to the above agglomerate, mixing the obtained dispersion with a polymerizable organic compound having a reactive group, such as an epoxy resin, and thereafter distilling off volatile components.

15 Claims, No Drawings

US 7,485,680 B2

PROCESS FOR PRODUCING RUBBERY POLYMER PARTICLE AND PROCESS FOR PRODUCING RESIN COMPOSITION CONTAINING THE SAME

This is a 371 national phase application of PCT/JP2004/013017 filed 1 Sep. 2004, claiming priority to Japanese Applications No. 2003-326711 filed 18 Sep. 2003, and No. 2004-063696 filed 8 Mar. 2004, the contents of which are incorporated herein by reference.

TECHNICAL FIELD

The present invention relates to a process for producing refined rubbery polymer particles from an aqueous latex of the rubbery polymer particles, as well as a process for producing a re-dispersion in which the refined rubbery polymer particles are re-dispersed in an organic solvent.

Further, the invention concerns a process for producing a resin composition in which rubbery polymer particles such as elastomeric material are re-dispersed in a thermosetting resin such as an epoxy resin and it can provide a resin composition with impurities being decreased remarkably compared with usual case.

Further, according to a preferred embodiment of the invention, since production can be carried out at a high efficiency by making steps continuous, it can provide a production process reduced in the cost of equipment.

BACKGROUND ART

Heretofore, in a case of producing a rubbery polymer from an aqueous latex of rubbery polymer particles, it has been practiced a method of at first obtaining a coagulate by various methods and then removing water or solvent from the coagulate followed by drying.

As a method of obtaining the coagulate, it has been proposed, for example, (1) a method of adding an inorganic electrolyte or acid as a coagulant, (2) a method of adding a nonionic polymer coagulant), (3) a method of bringing an organic solvent into direct contact with a latex, (4) a method of heating or freezing a latex, (5) a method of providing mechanical shearing force, or a method of appropriately combining them.

In this case, as a measure for removing an emulsifier and an electrolyte derived from the polymer and, further, impurities such as an inorganic electrolyte used as the coagulant from the obtained coagulate, a method of bringing the coagulate into contact with water has been adopted generally. However, for removing such impurities, not only a great amount of water is necessary but also impurities can not be removed sufficiently at present. Further, a method of cleaning by an organic solvent has also been used, but this complicates the steps to make the process industrially disadvantageous.

On the other hand, cured products of polymerizable organic compounds having reactive functional groups, for example, cured products of epoxy resins are excellent in various aspects such as dimensional stability, mechanical strength, electric insulation property, heat resistance, water proofness and chemical resistance. However, cured products of epoxy resins have low fracture toughness to sometimes show extremely brittleness and such nature often results in problems in wide range of application uses.

As one of methods for solving the problems, it has been attempted toblenda rubbery ingredient in an epoxy resin. Among all, a method of blending a rubbery polymer previously prepared into a particulate shape by using, for example, a polymerization method in an aqueous medium typically represented by emulsion polymerization, re-dispersion polymerization or suspension polymerization is considered to provide various advantages compared, for example, with a method of dissolving and mixing non-crosslinked indefinite rubber ingredient to an epoxy resin and then causing phase separation in the curing process thereby forming a dispersion phase of the rubber ingredient in an epoxy resin cured product continuous phase, such that the state of dispersion is less changed depending on the blending and curing conditions, in principle, and the rubber ingredient does not intrude to the continuous phase of the epoxy resin cured product by previously crosslinking the rubber ingredient thus causing less lowering of the heat resistance and the rigidity, and various production processes have been proposed.

For example, (6) a method of heating apartially cross linked rubbery random copolymer particles prepared by emulsion polymerization using a nonionic emulsifier or the like to a temperature higher than a cloud point of the emulsifier, thereby coagulating them, then optionally washing the coagulate with water and mixing the same with an epoxy resin (for example refer to JP Nos. 1708498, 2751071, and JP-A No. 5-295237), (7) a method of mixing a rubbery polymer latex and an epoxy resin and then evaporating off a water content to obtain a mixture (for example, refer to JP-A No. 6-107910), and (8) a method of mixing a rubbery polymer latex with an epoxy resin under the presence of an organic solvent to obtain a mixture (for example, refer to the specification of U.S. Pat. No. 4,778,851) are disclosed.

Since the method (6) described above is a method of obtaining a coagulate by the use of a coagulant, mainly, an inorganic electrolyte, impurities such as an emulsifier which is deposited to the polymer or confined in the coagulated polymer upon coagulation can not be removed sufficiently while a greater amount of water is used at present. Further, since the rubbery polymer particles are intensely adhered to each other by coagulation also including coagulation by heating, it requires pulverization or re-dispersion operation with a considerable large mechanical shearing force upon mixing with the epoxy resin, and it is often difficult to uniformly re-disperse the rubbery polymer particles in the epoxy resin while a larger amount of energy is used.

In the method (7) above, impurities such as emulsifier and electrolyte derived from the polymer are left as they are and, in addition, since the epoxy resin is only slightly soluble in water, even when a considerably large mechanical shearing force is applied, it still leaves a not-yet-mixed portion, and lumpy coagulate are sometimes formed in the not-mixed portion.

Since the method (8) described above does not include coagulating operation, an epoxy resin composition with the rubbery polymer being re-dispersed uniformly can be obtained easily, but a great amount of water content present together with the organic solvent in the system (mixture) (the water content more than the amount which the organic solvent can solve) has to be separated or evaporated off. However, separation of the organic solvent layer and the aqueous layer requires much time such as one day and one night, or the organic solvent layer and the aqueous layer are difficult to be separated substantially since they form a stable emulsified suspension. Further, in a case of removing the water content by evaporation, a great amount of energy is necessary and, in addition, water soluble impurities such as an emulsifier or sub-starting materials usually used in the production of rubbery polymer latexes remain in the composition to degrade the quality as well. Accordingly, removal of the water content is troublesome in any of the methods of separation or removal by evaporation, which can not be said industrially preferred.

An object of the present invention is to provide, as a process for producing rubbery polymer particles refined from an aqueous latex of rubbery polymer particles, an efficient production process of obtaining a loose flocculate from the rubbery polymer particles obtained in the state of an aqueous latex without using a coagulant under the presence of an organic solvent and discharging the impurities to the aqueous phase and, preferably, provide a further efficient production process capable of reduce the cost of equipment by a continuous processing. Further, it intends to provide a process for producing a resin composition conveniently and efficiently that can uniformly mix and disperse rubbery polymer particles in a polymerizable organic compound having a reactive functional group thereby remarkably decreasing impurities such as an emulsifier or an electrolyte derived from the polymer particles, by re-dispersing a loose flocculate again in the organic solvent and mixing the same with the polymerizable organic compound having the reactive functional group.

DISCLOSURE OF THE INVENTION

The present invention relates to;

(1) a process for producing refined rubbery polymer particles (A) comprising: bringing water (D) into contact with a mixture (C) obtained by mixing an aqueous latex of the rubbery polymer particles (A) with an organic solvent (B) exhibiting partial solubility to water; thereby forming a flocculate (F) of the rubbery polymer particles (A) containing the organic solvent (B) in an aqueous phase (E); and then separating the flocculate (F) (Claim 1);

(2) The process according to claim 1, wherein water (D) is continuously mixed and brought into contact with the mixture (C) (claim 2);

(3) The process according to claim 2, wherein the mixture (C) and the water (D) are supplied from the bottom of a mixing device and a mixture of the flocculate (F) and the aqueous phase (E) is recovered from an upper part of the mixing device (claim 3);

(4) a process for producing refined rubbery polymer particles (A), comprising: removing water and/or removing solvent from the flocculate (F) of the refined rubbery polymer particles (A) obtained by the process according to any one of claims 1 to 3, followed by drying (claim 4);

(5) a process for producing a dispersion (G), comprising: adding an organic solvent exhibiting an affinity with the rubbery polymer particles (A) to the flocculate (F) of refined rubbery polymer particles obtained by the process according to any one of claims 1 to 3; and thereby obtaining the dispersion (G) in which the rubbery polymer particles (A) are dispersed in the organic solvent (claim 5);

(6) a process for producing a resin composition in which rubbery polymer particles (A) dispersed in a polymerizable organic compound (H) having a reactive functional group, comprising: mixing the dispersion (G) obtained by the production process according to claim 5 and the polymerizable organic compound (H) and then removing the volatile ingredient by evaporation (claim 6), (7) a process for producing a resin composition comprising rubbery polymer particles (A) dispersed in a polymerizable organic compound (H) having a reactive functional group, comprising: mixing the flocculate (F) obtained by the process according to anyone of claims 1 to 3 and the polymerizable organic compound (H); then removing the volatile ingredient by evaporation (claim 7);

(8) The process for a resin composition according to claim 6 or 7, wherein the polymerizable organic compound (H) having the reactive functional group is an epoxy resin (claim 8);

(9) The process according to anyone of claims 1 to 8, wherein the solubility to water at 20° C. of the organic solvent (B) exhibiting a partial solubility to water is 5% by weight or more and 40% by weight or less (claim 9);

(10) The process according to anyone of claims 1 to 9, wherein the amount of water (D) to be brought into contact with the mixture (C) obtained by mixing the aqueous latex of the rubbery polymer particles (A) with the organic solvent (B) exhibiting the partial solubility to water is 40 parts by weight or more and 350 parts by weight or less based on 100 parts by weight of the organic solvent (B) (claim 10);

(11) The process according to anyone of claims 1 to 10, wherein the ratio of the organic solvent (B) exhibiting the partial solubility to water contained in the flocculate (F) is 30% by weight or more based on the whole weight of the flocculate (F) (claim 11);

(12) The process according to anyone of claims 1 toll, wherein the rubbery polymer particles (A) comprise a polymer having a two or more multi-layered structure and contain at least one layer of cross-linked rubbery polymer layer (claim 12);

(13) a process according to any one of claims 1 to 12, wherein the rubbery polymer particles (A) comprise a graft copolymer having from 5 to 60% by weight of a shell layer (A-2) obtained by polymerizing at least one vinyl polymerizable monomer selected from (meth)arcylic ester, aromatic vinyl, vinyl cyanate, unsaturated acid derivative, (meth)acrylamide derivative and maleimide derivative in the presence of from 40 to 95% by weight of a rubber particle core (A-1) comprising a elastmeric material constituted with 50 to 100% by weight of at least one monomer selected from diene monomers and (meth)arcylic ester monomers, and 0 to 50% by weight of other copolymerizable vinyl monomers, polysiloxane elastmeric materials or a mixture there of (claim 13);

(14) The process according to claim 13, wherein the shell layer (A-2) of the rubbery polymer particles (A) has at least one reactive functional group selected from the group consisting of epoxy group, carboxylic group, hydroxylic group and carbon-to-carbon double bond (claim 14);

(15) a flocculate (F) comprising rubbery polymer particles (A), organic solvent (B), and water (D) obtained by the process according to any one of claims 1 to 3 (claim 15);

(16) rubbery polymer particles obtained by the process according to any one of claims 1 to 4 (claim 16);

(17) a dispersion (G) comprising rubbery polymer particles (A), an organic solvent exhibiting an affinity with the rubbery polymer particles (A) and water (D), obtained by the production process according to claim 5 (claim 17);

(18) a resin composition obtained by the process according to any one of claims 6 to 14 (claim 18);

(19) a cured product formed by curing the epoxy resin composition obtained by the process of any one of claims 8 to 14 (claim 19).

In the process of the invention, an aqueous latex of the rubbery polymer particles (A) is, at first, mixed with the organic solvent (B) exhibiting the partial solubility to water.

The rubbery polymer particles (A) are not particularly limited but are preferably polymers having two or more multi-layered structure, particularly, preferably core-shell type polymers, from the view point that designing rubber properties is easy and further, resin compositions by the process of the present invention are easily manufactured. The core-shell type polymer is a polymer comprising a rubber particle core (A-1) formed of a polymer comprising an elastomeric or rubbery polymer as a main ingredient and a shell layer (A-2) formed of a polymer graft polymerized therewith, and it has a feature in that the shell layer (A-2) partially or entirely covers the surface of the rubber particle core (A-1) by graft polymerizing a monomer constituting the graft ingredient to the core.

It is preferred that the polymer constituting the rubber particle core (A-1) is crosslinked and the polymer constituting the rubber particle core (A-1) can swell to an appropriate solvent but it is not substantially dissolved to the solvent. Further, when it is intended to be dispersed in the epoxy resin, the rubber particles core (A-1) is preferably insoluble to the epoxy resin and, further, the gel content of the rubber particle core (A-1) is 60% by weight or more, more preferably, 80% by weight or more and, particularly preferably, 90% by weight or more and, most preferably, 95% by weight or more in the rubber particle core (A-1).

On the other hand, since it can be produced easily by known polymerization methods such as emulsion polymerization and it has favorable property as the rubber, the polymer constituting the rubber particle core (A-1) has a glass transition temperature (Tg) of 0° C. or lower and, preferably, −10° C. or lower. With a view point that it is available at a reduced cost and that the property of the obtained polymer as a rubber is excellent, the polymer constituting the rubber particle core (A-1) is preferably constituted from elastomeric material comprising from 50 to 100% by weight of at least one member selected from diene monomers (conjugated diene monomers) and (meth)arcylic acid ester monomer sand 0 to 50% by weight of other copolymerizable vinyl monomers, or polysiloxane type elastomers or a combination of them for use. In the invention, (meth)acryl means acryl and/or methacryl.

The diene monomer (conjugated diene monomer) constituting the elastomeric material is not limited particularly and can include, for example, butadiene, isoprene and chloroprene. Among them, butadiene is particularly preferred because the property of the obtained polymer is excellent as a rubber. Further, the (meth)acrylic ester monomer is not particularly limited and includes, for example, butyl acrylate, 2-ethylhexyl acrylate and lauryl methacrylate. With a view point that the property of the obtained polymer is excellent as a rubber, butyl acrylate or 2-ethylhexyl acrylate is particularly preferred. They can be used alone or as a combination of two or more of them.

Further, the above-mentioned elastomeric materials of a diene monomer or (meth)acrylate ester monomer may also be a copolymer of a vinyl monomer copolymerizable therewith. The vinyl monomer copolymerizable with the diene monomer or (meth)arcylic ester monomers can include, for example, aromatic vinyl monomers and vinyl cyanate monomers. As the aromatic vinyl monomers, for example, styrene, α-methylstyrene, vinyl naphthalene can be used, while as the vinyl cyanate monomers, for example, (meth) acrylonitrile or substituted acrylonitrile may be used. They may be used alone or as a combination of two or more of them.

The amount of the diene monomer or (meth)arcylic ester monomer to be used is, preferably, 50% by weight or more and, more preferably, 60% by weight or more based on the entire weight of the elastomeric material. In a case where the amount of the diene monomer or (meth)acrylic ester monomer to be used for the entire rubber elastomer is less than50% by weight, the ability of providing the toughness to the cured product of the polymerizable organic compound (H) having the reactive functional group, for example, an epoxy group is sometimes deteriorated. On the other hand, the amount of the monomer copolymerizable therewith to be used is, preferably, 50% by weight or less and, more preferably, 40% by weight or less based on the entire weight of the elastmeric material.

Further, as the ingredient constituting the elastmeric material, a polyfuntional monomer may also be contained for controlling the degree of crosslinking. The polyfunctional monomer can include, for example, divinylbenzene, butanediol di(meth)acrylate, triallyl (iso)cyanurate, allyl(meth) acrylic, diallyl itaconate, and diallyl phthalate. The amount of use thereof is 10% by weight or less, preferably, 5% by weight or less and, further preferably, 3% by weight or less based on the entire weight of the elastomeric material. In a case where the amount of use exceeds 10% by weight, the ability of providing the toughness to the cured product of the polymerizable organic compound (H) having the reactive functional group tends to be deteriorated.

Further, for controlling the molecular weight or the crosslinking degree of the polymer constituting the elastmeric material, a chain transfer agent may be used optionally. The chain transfer agent can include, for example, an alkylmercaptan containing from 5 to 20 carbon atoms. The amount of use is 5% by weight or less and, preferably, 3% by weight or less based on the entire weight of the elastmeric material. In a case where the amount of use exceeds 5% by weight, since the amount of the not-crosslinked ingredient in the rubber particle core (A-1) increases, when an epoxy resin composition is prepared, for example, it tends to give undesired effect on the heat resistance, rigidity, etc. of the composition.

Further, as the rubber particle core (A-1), a polysiloxane type elastomer may also be used instead of the elastmeric material described above or in combination therewith. In a case of using the polysiloxane type elastomer as the rubber particle core (A-1), a polysiloxane type elastomer constituted with dialkyl or diaryl substituted silyloxy unit, for example, dimethyl silyloxy, methylphenyl silyloxy, diphenyl silyloxy, etc. can be used. Further, in a case of using such polysiloxane type elastomer, it is more preferred to previously introduce a crosslinking structure by partially using a polyfunctional alkoxy silane compound together or by radial polymerization of silane compound having a vinylic reactive group during polymerization.

The shell layer (A-2) can provide the affinity to the rubbery polymer particles (A) for the dispersion stably in the form of primary particles in the polymerizable organic compound (H) having the reactive functional group.

The polymer constituting the shell layer (A-2) is graft polymerized with the polymer constituting the rubber particle core (A-1), preferably forming a chemical bonding with the polymer constituting the core (A-1) substantially. For facilitating the production of the resin composition in the production process of the invention, it is preferred that 70% by weight or more, more preferably, 80% by weight or more and, further preferably, 90% by weight or more of the polymer constituting the shell-layer (A-2) is bonded with the core (A-1).

The shell layer (A-2) preferably has swellability, compatibility or affinity to the organic solvent (B) to be described later and the polymerizable organic compound (H) having the reactivity group from the viewpoint that the rubbery polymer particles are uniformly mixed and dispersed easily in the polymerizable organic compound (H) having the reactive functional group.

Further, in accordance with the requirement during use, the shell layer (A-2) preferably has a reactivity with the polymerizable organic compound (H) having the reactive functional group or the curing agent blended upon use and has a capability of reacting and forming chemical bonding therewith under the reacting and curing conditions where the polymerizable organic compound (H) having the reactive functional group reacts with the curing agent.

The polymer constituting the shell layer (A-2) is preferably a polymer or copolymer obtained by polymerizing or copolymerizing one or more ingredient selected from (meth)arcylic esters, aromatic vinyl compounds, vinyl cyanate compounds, unsaturated acid derivatives, (meth)acrylamide derivatives and maleimide derivatives. Particularly, in a case where chemical reactivity is required for the shell layer (A-2) during curing of the epoxy resin, it is preferred to use a copolymer obtained by copolymerizing one or more of monomers containing one or more of reactive functional groups selected, for example, from epoxy group, carboxyl group, hydroxyl group, carbon-carbon double bond, amino group or amide group which has a reactivity, for example, with the polymerizable organic compound (H) to be described later, or a curing agent thereof, or a curing catalyst thereof, etc., in addition to alky(meth)arcylic ester, aromatic vinyl compound or vinyl cyanate compound. Further, the functional group is, more preferably, at least one reactive functional group selected from the group consisting of epoxy group, carboxyl group, hydroxyl group, or carbon-carbon double bond.

As examples of the (meth)arcylic esters, alkyl(meth)acrylate ester such as methyl(meth)acrylate, ethyl(meth)acrylate, or butyl(meth)acrylate, 2-ethylhexyl(meth)acrylate may be mentioned. As examples of the aromatic vinyl compounds, styrene, α-methylstyrene, alkyl-substituted styrene and, further, halogen-substituted styrenes such as bromo styrene, or chloro styrene maybe mentioned. Further, as examples of the vinyl cyanate compounds, (meth)acrylonitrile or substituted acrylonitrile may be mentioned. Further, as examples of the monomers containing the functional group having reactivity, 2-hydroxylethyl (meth)acrylate, 2-aminoethyl(meth)acrylate or glycidyl(meth)acrylate as (meth)acrylate esters having the reactive side chain may be mentioned. As examples of the vinyl ether containing the reactive group, glycidyl vinyl ether or allyl vinyl ether may be mentioned. As examples of the unsaturated carboxylic acid derivatives, (meth)acrylic acid, itaconic acid, chrotonic acid and maleic acid anhydride, etc may be mentioned. As examples of (meth)acrylamide derivative, (meth)acrylamide (including N-substituted product) may be mentioned. As examples of the maleimide derivative, maleicacid imide (including N-substitution product) may be mentioned.

A preferred rubber particle core (A-1)/shell layer (A-2) ratio (weight ratio) of the rubbery polymer particles (A) is within a range of 40/60 to 95/5, more preferably, 50/50 to 95/5 and, further preferably, 60/40 to 85/15. In a case where the (A-1)/(A-2) ratio is out of 40/60 and the ratio of the rubber particle core (A-1) is lowered, the effect of improving the toughness for the polymerizable organic compound (H) having the reactivity tends to be lowered. On the other hand, in a case where the ratio is out of 95/5 and the shell layer (A-2) ratio is lowered, coagulation tends to occur to result in a problem for the operability during handling in this production process and the expected properties may not be obtained.

The rubbery polymer particles (A) can be produced by a well-known method, for example, emulsion polymerization, suspension polymerization, or micro-suspension polymerization. Among them, a production process by the emulsion polymerization is suitable from the view point that the design for the composition of the rubbery polymer particles (A) is easy, the industrial production is easy and the latex of the rubbery polymer particles suitable to this process can be obtained easily. As the emulsifying or dispersing agent in an aqueous medium, it is preferred to use those not losing the emulsifying or dispersion stability) even in a case where pH of the aqueous latex is made neutral. Specifically, they include, for example, nonionic emulsifier or dispersant such as alkali metal salts or ammonium salts of various acids, for example, alkyl or aryl sulfonic acids typically represented by dioctyl sulfosuccinic acid or dodecylbenzene sulfonic acid, alkyl or aryl sulfonic acid typically represented by dodecyl sulfonic acid, alkyl or aryl ether sulfonic acid, alkyl or aryl substituted phosphoric acid, alkyl or aryl ether substituted phosphoric acid, or N-alkyl or aryl sarcosinic acid typically represented by dodecyl sarcosinic acid, alkyl or aryl carboxylic acid typically represented by oleic acid or stearic acid, alkyl or aryl ether carboxylic acids, and alkyl or aryl substituted polyethylene glycol, and dispersant such as polyvinyl alcohol, alkyl substituted cellulose, polyvinyl pyrrolidone or polyacrylic acid derivative. They may be used alone or two or more of them may be properly combined for use.

In view of the purpose of the invention, the emulsifying or dispersing agent described above is preferably used in a smallest amount to maintain the required emulsion or dispersion stability during the latex preparation process of the rubbery polymer particles (A), or it is more preferred that it is extracted and removed to the aqueous phase (E) to such a residual amount as not giving undesired effects on the properties of the resin composition produced based on this production method.

The particle size of the rubbery polymer particles (A) usable in the production process according to the invention is not particularly limited and any of those capable of obtaining (A) stably in the state of the latex can be used without problem and, with a view point of industrial productivity, however, those having a volume average particle size of 0.03 to 2 μm are more preferred in view of easy production. The volume average particle size can be measured, for example, by using MICROTRACK UPA or MICROTRACK FRA (each manufactured by Nikkiso Co.).

As the organic solvent (B) exhibiting the partial solubility to water used in the invention, any solvent can be used with no restriction so long as it is at least one or more organic solvents or an organic solvent mixture capable of attaining mixing of the rubbery polymer particles (A) and the organic solvent (B) with no substantial coagulation) and precipitation upon mixing, and it is preferably an organic solvent having a solubility to water at 20° C. of 5% by weight or more and 40% by weight or less and, more preferably, 5% by weight or more and 30% by weight or less. In a case where the solubility of the organic solvent (B) to water at 20° C. exceeds 40% by weight, the aqueous latex of the polymer particles (A) sometimes cause partial coagulation to result in a trouble in the smooth mixing operation. In a case where the solubility to water is less than 5% by weight, the mixing operation of the polymer particles (A) with the aqueous latex becomes insufficient tending to make the smooth mixing difficult.

Specific examples of the organic solvent (B) includes one or more organic solvents selected from esters such as methyl acetate, ethyl acetate, propyl acetate, and butyl acetate, ketones such as acetone, methyl ethyl ketone, diethyl ketone and methyl isobutyl ketone, alcohols such as methanol, (iso) propanol, and butanol, ethers such as tetrahydrofuran, tetrahydropyrane, dioxane and diethyl ether, aromatic hydrocarbons such as benzene, toluene, and xylene, and halogenated hydrocarbons such as methylene chloride and chloroform, or a mixture thereof which can satisfy the solubility to water at 20° C. within the range described above. Among them, from a view point of affinity with the polymerizable organic compound having the reactivity and easy availability, those containing 50% or more of methyl ethyl ketone are further preferred and those containing 75% by weight or more are particularly preferred.

While the amount of the organic solvent (B) to be used may vary depending on the kind of the rubbery polymer particles (A), or the solid concentration of the rubbery polymer particles (A) in the aqueous latex, the organic solvent (B) is used in an amount of preferably from 50 to 400 parts by weight and, more preferably, from 70 to 300 parts by weight based on 100 parts by weight of the latex of the rubbery polymer particles (A). In a case where the amount of the organic solvent (B) is less than 50 parts by weight, the rubbery polymer particles (A) can not sometimes be dispersed stably and viscosity increases tending to make handling difficult. On the other hand, in a case where it exceeds 400 parts by weight, the amount of the organic solvent (B) increases, which is not economical in view of the substrate removal.

In the mixing operation for the aqueous latex of the rubbery polymer particles (A) and the organic solvent (B) exhibiting the partial solubility to water, no special device or method is necessary and any known device or method can be used so long as a good mixing state can be obtained. While usual device includes a mixing vessel with an agitator, continuous processing by a static mixer or line mixer (system of incorporating a mixing device to a part of pipeline) is also possible.

In the invention, the mixture (C) obtained as described above is brought into contact with water (D). By the operation, a part of the organic solvent (B) contained in the mixture (C) is dissolved into water (D) and can form an aqueous phase (E). At the same time, the water content derived from the aqueous latex contained in the mixture (C) can also be drained to the aqueous phase (E). Accordingly, the mixture (C) is in the form where the rubbery polymer particles (A) are concentrated in the water-containing organic solvent (B) and, as a result, a flocculate (F) is formed.

The operation of forming the flocculate (F) is preferably carried out, from a view point of preventing the occurrence of partial non-flocculated product, under mixing or under flowing condition capable of providing identical fluidity with that of the mixing. For example, it can be carried out by batchwise operation or continuous operation in a stirring vessel with a stirrer. For the addition method of water (D), for example, a continuous addition method or a collective addition method can be applied.

In the invention, for carrying out the operation of forming the flocculate (F) efficiently, it is preferred to continuously supply the mixture (C) and water (D) to a device provided with a mixing function, mix and contact them thereby continuously obtaining the flocculate (F) and the aqueous phase (E). The agitator or the shape of the device for mixing is not particularly limited but since the flocculate (F) generally has a floating property relative to the aqueous phase (E), it is preferable to adopt a method of supplying the mixture (C) and water (D) from the bottom of the device and extract the flocculate (F) and the aqueous phase (E) from the upper portion of the device. Herein, the bottom part of the device means that it situates at a position of ⅓ or less for the height from the bottom face of the device to the liquid surface with reference to the bottom, while the upper portion of the device means that it situates at a position of ⅓ from the liquid surface or higher to the the liquid surface, with reference to the height from the bottom face of the device to the liquid surface. By adapting the operation of forming the flocculate (F) continuously as described above, it is possible to reduce the cost of equipment by the scale-reduction of the device and improve the productivity.

While the amount of water (D) added to or brought in to contact with the mixture (C) may vary depending on the kind of the rubbery polymer particles (A), the solid concentration of the rubbery polymer particles (A) in the aqueous latex, and the kind and the amount of the organic solvent (B), the amount of water (D) is preferably 40 parts by weight or more and 350 parts by weight or less and, more preferably, 60 parts by weight or more and 250 parts by weight or less based on 100 parts by weight of the organic solvent (B) used upon mixing with the aqueous latex. In a case where the amount of the water (D) is less than 40 parts by weight, the flocculate (F) of the rubbery polymer particles (A) tends to be less formed and, on the other hand, in a case where it exceeds 350 parts by weight, since the concentration of the organic solvent (B) in the flocculate (F) formed is lowered, the dispersibility tends to be lowered such that it requires a longer time for re-dispersion of the flocculate (F) in the subsequent step.

The flocculating operation and the flocculate (F) formed in the invention have the following features.

(a) Generally, in the coagulating operation by the addition of a coagulant such as an electrolyte or an acid, or by heating operation, most of the emulsifier or the electrolyte derived from the latex of the rubbery polymer particles (A) are often adsorbed to the surface of the coagulate, or included in the inside of the coagulate and they can not be removed easily even when washed with water after coagulation. On the contrary, in the invention, since the emulsifier and the electrolyte derived from the rubbery polymer particles (A) are released from the flocculate (F) and then transferred to the aqueous phase (E) through the operation from the mixing of the latex of the rubbery polymer particles (A) with the organic solvent (B) to the flocculation of the rubbery polymer particles (A), they can be removed easily.

(b) Generally, coagulate formed by the addition of an electrolyte or a coagulant such as an acid or by heating operation is a firm coagulate which is difficult to be re-dispersed from the state of the coagulate to the state of primary particles of the rubbery polymer particles (A) even by mechanical shearing. On the other hand, for the flocculate (F) obtained by the invention, most portion thereof can be re-dispersed as the primary particles of the rubbery polymer (A), for example, by subsequent mixing with an organic solvent exhibiting affinity with the rubbery polymer particles (A) under mixing. That is, the flocculate (F) obtained in the invention has a reversibility in the organic solvent with respect to flocculation and re-dispersion of the particles. This is referred to as a loose flocculate in the invention.

The reason regarding (b) above has not yet been elucidated sufficiently but it is considered that the rubbery polymer particles (A) transform reversibly from the state being dispersed as particles in the organic solvent (B), through the increase of polymer particle concentration caused by the elution of the organic solvent (B) into the aqueous phase (E) by adding water (D) into a moderately flocculated state containing the organic solvent, and as a result, the flocculate (F) is formed. Accordingly, it is considered that particle re-dispersion of the rubbery polymer particles (A) can be reproduced easily by the re-addition of the organic solvent in the production process of the invention.

Accordingly, by separating the formed flocculate (F) and the aqueous phase (E) containing the organic solvent, it is possible to remove the water content contained in the organic solvent (B) entrained in the flocculate (F) and obtain refined rubbery polymer particles (A), from which most portion of the emulsifier and the electrolyte derived from the rubbery polymer particles (A) is separated and removed together with the aqueous phase (E).

Separability between the flocculate (F) and the aqueous phase (E) is favorable, and separation can be carried out by using a usual filter such as filter paper, filter cloth or metal screen having relatively coarse openings. In a case of optionally removing the impurities such as the emulsifier or the electrolyte remained in the water content entrained in the flocculate (F), it is preferred to repeat the operation of adding water containing the organic solvent (B) and separating the flocculate (F) and the aqueous phase (E).

In a case where it is intended to obtain refined rubbery polymer particles (A) as a dry powder, this can be obtained by subjecting the flocculate (F) to water removal and/or solvent removal, followed by drying. In this case, it is preferred to finally wash the flocculate (F) with water not containing the organic solvent (B). This is because particles tend to be agglomerated to each other if the organic solvent (B) is contained in a great amount. As described above, the dry powder of the rubbery polymer particles (A) with extremely less impurity content can be obtained.

On the other hand, in a case of producing a dispersion (G) or a resin composition in which the rubbery polymer particles (A) are dispersed in an organic solvent showing affinity with the rubbery polymer particles(A) or a polymerizable organic compound (H) having the reactive functional group, the amount of the organic solvent (B) contained in the flocculate (F) obtained as described above by way of the flocculating and the separating operation as described above is preferably 30% by weight or more and, more preferably, 35% by weight or more based on the entire weight of the flocculate (F). By the incorporation of the organic solvent (B), dispersion to the organic solvent exhibiting the affinity with the rubbery polymer particles (A) or the polymerizable organic compound(H) having the reactive functional group to be carried out successively can be practiced satisfactorily. In a case where the content of the organic solvent (B) is less than 30% by weight based on the entire weight of the flocculate (F), it may sometimes result in disadvantages such as requiring a longer time for dispersion into the organic solvent exhibiting the affinity with the rubbery polymer particles (A) or to the polymerizable organic compound (H) having the reactivity group in the next step, or tending to leave irreversible coagulate and, as a result, dispersibility of the rubbery polymer particles (A) into the polymerizable organic compound (H) tends to be lowered remarkably.

The amount of the rubbery polymer particles (A) contained in the aqueous phase (E) separated and removed by the series of operations described above is 10% by weight or less, preferably, 5% by weight or less, and further preferably, 2% by weight or less based on the whole amount of the aqueous phase (E) and it is most preferred that the rubbery polymer particles (A) are not substantially contained.

Then, re-dispersion of the obtained flocculate (F) into the organic solvent exhibiting the affinity with the rubbery polymer particles (A) is to be described. By the operation, the dispersion (G) in which the refined rubbery polymer particles (A) in the flocculate (F) are dispersed in the organic solvent substantially in the state of primary particles can be obtained.

The amount of the organic solvent added may vary also depending on the kind of the rubbery polymer particles (A) and the kind and the amount of the organic solvent. The amount of the organic solvent added, is preferably, from 40 to 1400 parts by weight and, more preferably, from 200 to 1000 parts by weight based on 100 parts by weight of the rubbery polymer particles (A). When the amount of the organic solvent added is less than 40 parts by weight, the rubbery polymer particles (A) are less dispersed uniformly in the organic solvent, lumps of the flocculate (F) of the rubbery polymer particles (A) tends to remain, or the viscosity increases, making the handling difficult. When it exceeds 1400 parts by weight, it requires a great amount of energy and a large scale equipment upon final evaporative removal of volatile ingredients by evaporation, which is not economical.

The organic solvent exhibiting the affinity with the rubbery polymer particles (A) used herein is not particularly limited so long as it can re-disperse the rubbery polymer particles (A) and includes, for example, those exemplified for the organic solvent (B) used in the preceding step, as well as aliphatic hydrocarbons such as hexane, heptane, octane, cyclohexane, ethylcyclohexane, and mixtures thereof. From a view point of further ensuring the re-dispersibility of the loose flocculate, it is preferred to use an organic solvent of a kind identical with that of the organic solvent (B) used in the preceding step.

In the invention, the mixing operation of the flocculate (F) and the organic solvent exhibiting the affinity with the rubbery polymer particles (A) is not particularly limited but it can be carried out by a usual device having a mixing function.

Then, description is to be made for mixing of the dispersion (G) in which the thus obtained rubbery polymer particles (A) are dispersed with the polymerizable organic compound (H) having the reactive functional group and then removing volatile ingredients by evaporation. This operation can provide a resin composition in which the rubbery polymer particles (A) are dispersed in the polymerizable organic compound (H) having a reactive functional group and which scarcely contains an emulsifier and an electrolyte derived from the polymer particles.

The polymerizable organic compound (H) having the reactive functional group used in the invention includes, for example, thermosetting resins such as epoxy resin, phenol resin, polyurethane resin and vinyl ester resin, radical polymerizable monomers such as aromatic vinyl compound, (meth)acrylic acid derivative, vinyl cyanate compound and maleimide compound, and starting materials for aromatic polyesters such as dimethyl terephthalate and alkylene glycol. Among all, the process of the invention can be used particularly suitably to a thermosetting resin typically represented by the epoxy resin with which the rubbery polymer particles described above are usually difficult to be blended.

The epoxy resin usable in the invention is not particularly limited so long as it is a compound having an epoxy group, and the epoxy resin usable in the invention is preferably an epoxy resin also referred to as a polyepoxide. The epoxy resin described above includes, for example; polyglycidyl ethers such as addition reaction products of polyhydric phenols such as bisphenol A, bisphenol F, biphenol, and phenols novolac, and epichlorohydrin; polyvalent glycidyl amine compounds derived from monoamines and polyamines such as aniline, diamino benzene, aminophenol, phenylene diamine and diaminophenyl ether; cycloaliphatic epoxy resins having cycloaliphatic epoxy structures such as cyclohexyl epoxy; addition reaction products of polyhydric alcohols and epichlorhiderin; halogenated epoxy resins obtained by substituting a portion of hydrogen atoms thereof with halogen elements such a bromine; homopolymers or copolymers obtained by polymerizing monomers including unsaturated monoepoxide such as aryl glycidyl ether. They may be used alone or as a mixture of two or more of them. Various polyepoxides synthesized from polyhydric phenols are described, for example, in U.S. Pat. No. 4,431,782. Examples of the polyepoxides further include those described in U.S. Pat.

Nos. 3,804,735, 3,892,819, 3,948,698 and 4,014,771, and in Epoxy Resin Hand book (published from Nikkan Kogyo Shinbun Co. 1987).

The epoxy resins usable in the invention are as described above and they generally include those having an epoxy equivalent weight from 80 to 2000. Such polyepoxides can be obtained by well-known methods and the method of ten adopted usually includes, for example, reaction of epihalohydrin in an excess amount to a polyhydric alcohol or polyhydric phenol under the presence of a base.

The epoxy resin usable in the invention may also contain, as a reactive diluent, a monoepoxide, for example, an aliphatic glycidyl ether such as butyl glycidyl ether or phenyl glycidyl ether or cresyl glycidyl ether. As is generally known, mono-epoxide gives an effect on the stoichiometrical amount of the polyepoxide blend and it can be adjusted by the amount of a curing agent, or by other well-known method.

For the epoxy resin ingredient used in the invention, it is possible to incorporate a curing agent and/or curing promoter for the epoxy group-containing compound described above and it is preferably a curing agent and/or curing promoter not substantially causing unexpected curing reaction with an epoxy resin under the condition of this production process. For the curing agent and/or curing promoter, those satisfying the requirements described above can be selected from those described in Epoxy Resin Handbook described above and can be used.

For the method of removing by evaporation volatile ingredients such as an organic solvent (B), known methods are applicable. For example, they include a method of charging the mixture in a vessel and removing by evaporation under heating at a reduced pressure, a method of putting a drying gas and the mixture in a counter current contact manner in a vessel, a continuous method such as using a thin film evaporator, or a method of using an extruder or a continuous mixing vessel provided with an evaporative removing mechanism. The conditions of temperature, necessary time, etc. upon removing the volatile ingredients by evaporation can be properly selected within the range not deteriorating the quality of the resin composition. The amount of the volatile ingredient remaining in the composition can be properly selected within the range not causing problem in accordance with the purpose of use of the composition.

According to the production process of the invention, an epoxy resin composition in which the rubbery polymer particles (A) are uniformly dispersed in the polymerizable organic compound (H), for example, an epoxy resin ingredient and less impurities are included can be produced easily and efficiently. The resin composition, for example, an epoxy resin composition obtained by the invention is usable generally to various application uses to which epoxy resins are used usually, for example, as fiber or filler reinforcing composite materials useful for industrial materials or sports goods, adhesives, paints, coating materials, binders, and electric and electronic part materials such as semiconductor sealant, lamination plates for use in circuit substrates, and metal foils with resin, and cured molding product in which the dispersion state of the rubbery polymer particles (A) in the cured product is extremely stably and less impurities are included can be obtained.

As described above, according to a preferred embodiment of the invention, a flocculate (F) from which impurities are remarkably removed can be obtained continuously. This enables to continuously carry out the operation of removing water and/or removing solvent from the mixture of the flocculate (F) and the aqueous phase (E), operation of dispersing the flocculate (F) after the removing water and/or removing solvent again into an organic solvent, operation of mixing the dispersion (G) in which the flocculate (F) is dispersed with the polymerizable organic compound (H) and operation of removing the volatile ingredient by evaporation from the mixture of the dispersion (G) and the polymerizable organic compound (H), thereby enabling a continuous production method suitable to manufacture a few kinds of products in a large volume.

BEST MODE FOR PRACTICING THE INVENTIONS

The present invention is to be described specifically by way of examples but the invention is not restricted to such examples.

In the followings, the residual amount of impurities was analyzed based on the amount of the emulsifier (anionic surfactant) and whole ions as the index. Further, the dispersion state of the rubbery polymer particles in the epoxy resin ingredient, that is, absence or presence of coagulation was judged by preparing a micro-thin slice from the obtained cured product of the epoxy resin composition and then observing it under a transmission electron microscope (TEM).

Before description of examples, the analyzing and measuring method used in the invention are to be explained below.

[1] Residual Amount of Emulsifier

For the residual amount of the emulsifier, the amount of the emulsifier remaining in the dispersion (G) before mixing with the epoxy resin (H) was measured by the following analysis method, which is digitalized as a ratio (wt %) assuming the whole amount of the emulsifier used in the polymerization of the rubbery polymer particles (A) to be 100 wt %, and it was defined as the index.

[1-1] Pretreatment for Sample

In the following examples, a dispersion (G) in which the rubbery polymer particles (A) before mixing with the epoxy resin (H) was sampled by 5 ml, dried to solidness and charged together with 50 ml of ethanol into a beaker. After mixing the sample for 10 min, supernatants were used as a sample for analysis by a methylene blue method to be described later.

[1-2] Methylene Blue Method 30 ml of water, 10 ml of an alkaline solution of sodium borate and 5 ml of a methylene blue solution (aqueous 0.025 wt % solution) were charged in a separable flask. 20 ml of chloroform was added and shaken for 3 to 5 min and then a chloroform layer was separated and removed. The addition/removal operation of chloroform was repeated till the chloroform layer was no more colored. Then, after adding 3 ml of diluted sulfuric acid (aqueous solution of 2.9 wt %), 20 ml of chloroform and 2 ml of sample prepared in [1-1] above, and shaking the mixture for 3 to 5 min, the chloroform layer was measured for the residual amount of the emulsifier in the dispersion (G) before mixing the epoxy resin (A) by using a spectrophotometer (spectrophotometer UV-2200, manufactured by Shimadzu corporation), at an absorption of 650 nm wave length. The alkaline solution of sodium borate was prepared by mixing 500 ml of 0.4 wt % sodium hydroxide solution to 500 ml of an aqueous 1.9 wt % solution of tetrasodium borate decahydrate.

[2] Residual Electrolyte (to Whole Ion)

Supernatants obtained in the same manner as in the sample pretreatment were measured as the sample for measuring electrical conductivity by using an electro conductive mater (GM-117 manufactured by Kyoto electronics manufacturing Co. LTD.) The ratio of the amounts of ions removed by a series of operations relative to the whole amount of the ions derived from the latex of the rubbery polymer particles (A) (measured value for the rubbery polymer particles (A) dried to solidness) was calculated as the total ion removal ratio.

[3] Ratio of Organic Solvent in Flocculate (F)

The ratio of the organic solvent in the flocculate (F) was calculated by measuring, the solid concentration (SC) and water content (WC) of the flocculate (F) by the following method and using the following formula. Ratio of organic solvent in flocculate (F)=100−(SC+WC)

[3-1] Measurement of Solid Concentration (SC) of Flocculate (F)

The flocculate (F) was sampled by a predetermined amount and dried in a hot blow drier, so that the solid concentration (SC) of the flocculate (F) was calculated based on the change of weight before and after drying.

[3-2] Measurement For Water Content (WC) in Flocculate (F)

After sampling the flocculate (F) by a predetermined amount and dispersing in a soluble solvent, the water content in the flocculate (F) was measured by a Karl Fisher method to calculate the water content (WC) to the whole flocculate (F).

[4] Determination of Rubbery Polymer Particles (A) Contained in Aqueous Phase

A portion of an aqueous phase discharged by the method described in examples and comparative examples was taken and dried the same at 120° C. sufficiently to obtain a residue, which was defined as the amount of rubbery polymer particles (A) contained in the aqueous phase.

[5] Volatile Ingredient in Epoxy Resin Composition

In examples and comparative examples for obtaining the epoxy resin composition, vacuum evaporation was continued till the volatile ingredient to be defined below reached 5000 ppm. After precisely weighing about 3 g of the epoxy resin composition, it was heated in a hot blow dryer at a setting temperature of 170° C. for 20 min and the weights before and after heating were measured, and the decrement of the weight was defined as a volatile ingredient (ppm) to calculate the weight ratio based on the weight before heating.

[6] Dispersed State of Rubbery Polymer Particles

[6-1] Preparation of Epoxy Resin Cured Product 51.9 g of an epoxy resin composition obtained in examples and comparative examples and 13.1 g of diaminodiphenyl sulfone (manufactured by Tokyo Kasei Co. LTD) were charged in a 100 ml beaker and mixed under mixing. The mixture was stood still in a vacuum dryer, heated at first under a nitrogen atmosphere to 130° C. and then the volatile ingredient was removed by defoaming under a reduced pressure for 10 min. After poring the mixture into a molding die sized 100 mm×150 mm×3 mm, it was heated at 180° C. for 2 hours and further heated at 220° C. for 2 hours for curing to obtain a cured molding product.

[6-2] Observation For Dispersed State of Rubbery Polymer Particles Under Transmission Electron Microscope After a portion of the obtained molding product was cut out and, the rubbery polymer particles (A) was dyed with osmium oxide, a slice was cut out and observed under a transmission electron microscope (JEM 1200 EX type, manufactured by JEOL Ltd.) at a factor of 10000×, to judge the dispersion state of the rubbery polymer particles (A) in the epoxy resin cured product.

PRODUCTION EXAMPLE 1

Production of Latex of Rubbery Polymer Particles (A)

200 parts by weight of water, 0.03 parts by weight of tripotassium phosphate, 0.25 parts by weight of dihydrogen potassium phosphate, 0.002 parts by weight of ethylene diamine tetraacetate, 0.001 parts by weight of ferrous sulfate and 1.5 parts by weight of sodium dodecyl benzene sulfonate were charged in a 100 L pressure proof polymerizing vessel, oxygen was removed by sufficient nitrogen substitution while mixing, then 75 parts by weight of butadiene and 25 parts by weight of styrene were charged in a system and temperature was warmed to 45° C. 0.015 parts by weight of paramentane hydroperoxide and, successively, 0.04 parts by weight of sodium formaldehyde sulfoxylate were charged to start polymerization. At 4 hours after starting polymerization, 0.01 parts by weight of paramenthane hydroperoxide, 0.0015 parts by weight of ethylene-diamine-tetra-acetate and 0.001 parts by weight of ferrous sulfate were added. At 10 hours of polymerization, residual monomers were removed by volatilization under a reduced pressure to terminate polymerization. The polymerization conversion ratio was 98% and the volume average particle size of the obtained styrene-butadiene rubber latex was 0.1 μm.

Successively, 1300 g of the rubber latex (containing 420 g of styrene-butadiene rubber particles and containing 1.5% by weight of sodium dodecyl benzene sulfonate as the emulsifier based on the solid of the rubber) and 440 g of refined water were charged in a 3 L glass vessel and stirred at 70° C. under a nitrogen substitution. After adding 1.2 g of azobis isobutyronitrile (AIBN), a mixture of 54 g of styrene, 72 g of methyl methacrylate, 36 g of acryonitrile and 18 g of glycidyl methacrylate were added continuously for 3 hours to carry out graft polymerization. After the completion of the addition, stirring was further applied for 2 hours and the reaction was terminated to obtain a latex of the rubbery polymer particles (A). The polymerization conversion ratio was 99.5% . The obtained latex was used as it was.

EXAMPLE 1

To a 1-L vessel of an inner diameter 100 mm (equipped with an agitator having flat 4-blade impeller in a size of 75 mm blade diameter) were installed for 3 stages in the axial direction), 126 g methyl ethyl ketone (water solubility at 20° C. of 10% by weight) was charged, and 126 g of the aqueous latex of rubbery polymer particles (A) obtained in Production Example 1 was charged under mixing at 500 rpm. After mixing uniformly, 200 g of water was added at a feed rate of 80 g/min under stirring at 500 rpm. After completion of feeding, the mixing was stopped immediately, a slurry comprising an aqueous phase containing floating flocculate (F) and a portion of the organic solvent was obtained.

An aqueous phase was discharged by 348 g from a draining port at a lower portion of the vessel while leaving the flocculate (F) containing a portion of the aqueous phase. The flocculate (F) containing the portion of the aqueous phase was 104 g and the ratio of the organic solvent was 39% by weight based on the whole weight of the flocculate (F). The flocculate (F) has a floating property and the flocculate (F) comprised particles having a particle size distribution. When a portion thereof was sampled and put to image analysis, the number average particle size was about 5 mm. Further, the concentration of the rubbery polymer particles (A) in the discharged aqueous phase was 0.23% by weight.

The obtained flocculate (F) was filtered through a filter with a suction bottle and dried by using a box-type dryer under a nitrogen atmosphere at 40° C. for 12 hours to obtain refined rubbery polymer particles (A). A portion of the obtained flocculate was sampled, to which methyl ethyl ketone was added to prepare a dispersion (G) and the remaining emulsifier and the electrolyte were measured and, as a result, the removal ratios were 95% and 90% respectively.

EXAMPLE 2

136 g of methyl ethyl ketone was added to 94 g of the flocculate (F) obtained in Example 1, mixed under the mixing condition at 500 rpm for 30 min to obtain a dispersion (G) in which the rubbery polymer particles (A) were uniformly dispersed. The dispersion (G) was transferred to a 1-L vessel of 100 mm inner diameter equipped with a jacket and a agitator (the agitator provided with an anchor impeller having a 90 mm blade diameter) and 92 g of an epoxy resin (Epicoat 828, manufactured by Japan Epoxy Resins Co.) was added and mixed uniformly. Then, the jacket temperature (warm water) was set to 60° C., and evaporation was continued by using a vacuum pump (oil-sealed rotary vacuum pump, TSW-150 manufactured by Sato Vac. INC), till the volatile ingredient reached a predetermined concentration (5000 ppm) under vacuum, to obtain a transparent epoxy resin composition containing the rubbery polymer particles (A). The time required for evaporation was 5 hours and 20 min. As a result of observing the dispersed state of the rubbery polymer particles (A) in the cured product obtained from the epoxy resin composition, they were uniformly dispersed with no coagulation.

EXAMPLE 3

To a 1-L vessel of 100 mm inner diameter equipped with an agitator (the agitator with Pfaudler impeller having a 56 mm blade diameter), 144 g of methyl ethyl ketone was charged, and 144 g of an aqueous latex of rubbery polymer particles (A) obtained in Production Example 1 was charged under mixing at 400 rpm and mixed uniformly. After introducing 207 g of water moderately from the draining port at a lower port of the vessel in a state of stopping the mixing, mixing was effected for 2 min under mixing at 400 rpm. After completion of the stirring, a slurry comprising an aqueous phase containing the flocculate (floating property) and the organic solvent was obtained. An aqueous phase was discharged by 373 g from a draining port at a lower port of the vessel while leaving the flocculate (F) containing a portion of the aqueous phase. The flocculate (F) containing the portion of the aqueous phase was 122 g and the ratio of the organic solvent was 45% by weight based on the whole weight of the flocculate. The number average particle size of the flocculate was about 5 mm. Further, the concentration of the ingredient of the rubbery polymer particles(A) in the discharged aqueous phase was 0.28% by weight. Subsequently, by the same procedures as those in Example 1, polymer particles were obtained. A portion of the obtained flocculate was sampled, to which methyl ethyl ketone was added to prepare a dispersion (G) and remaining emulsifier and electrolyte were measured and, as a result, the removal ratios were 92% and85% respectively.

EXAMPLE 4

173 g of methyl ethyl ketone was added to 122 g of the flocculate obtained in Example 3, mixed under the mixing condition at 400 rpm for 30 min to obtain a dispersion in which the rubbery polymer particles (A) were uniformly dispersed. The dispersion was transferred to a 1-L vessel of 100 mm inner diameter equipped with a jacket and an agitator (the agitator provided with an anchor impeller having 90 mm blade diameter) and 116 g of an epoxy resin (Epicoat 828 manufactured by Japan Epoxy Resins Co.) was added and mixed uniformly. Then, the jacket temperature (warm water) was set to 60° C., and evaporation was continued by using a vacuum pump till the volatile ingredient reached a predetermined concentration (5000 ppm) under vacuum, to obtain a transparent epoxy resin composition containing the rubbery polymer particles (A). The time required for evaporation was 5 hours and 20 min. As a result of observing the dispersed state of the rubbery polymer particles (A) in the cured product obtained from the epoxy resin composition, they were uniformly dispersed with no coagulation.

COMPARATIVE EXAMPLE 1

Residual Amount of Impurities in the Coagulated Particles by Addition of Coagulant To an 1-liter volume vessel of 100 mm inner diameter equipped with an agitator (the agitator with flat 4-blade impeller having 75 mm blade diameter were installed for 3 stages in the axial direction), 500 g of the aqueous latex of the rubbery polymer particles (A) of Production Example 1 was charged and, under 400 rpm, 13 g of an 35 wt % water solution of calcium chloride as a coagulant was charged to form a coagulate. The coagulate was filtered by a filter with a suction bottle. After adding 500 g of water to the coagulate on the filter for washing, the coagulate was dried at 40° C. for 12 hours by using a box-type drier to obtain rubbery polymer particles (A). When the coagulate after washing was separately sampled by 10 g and mixed with 100 g of methyl ethyl ketone by using a homo mixer, the rubbery polymer particles (A) were not completely dispersed in the methyl ethyl ketone but partially having the shape of coagulated particles as they were. Accordingly, when as a sample pretreatment, the coagulate after washing was sampled by 10 g and mixed with methanol to extract impurities to bring a sample of 50 ml and, when remaining emulsifier and electrolyte were measured by using the same, the removal ratio was 22% and 15%, respectively.

COMPARATIVE EXAMPLE 2

Dispersibility of Coagulated Particles into Resin Composition by Addition of Coagulant.

50 g of the rubbery polymer particle(A) after drying obtained in Comparative Example 1 was transferred to a 1-L vessel of 100 mm inner diameter equipped with a jacket and an agitator (the agitator provided with an anchor blade having 90 mm blade diameter) and 135 g of an epoxy resin (Epicoat 828 manufactured by Japan Epoxy Resins Co.) was added and mixed uniformly. Then, the jacket temperature (warm water) was set to 60° C., and evaporation was continued by using a vacuum pump (oil-sealed rotary vacuum pump, TSW-150 manufactured by Sato VAC. Inc), till the volatile ingredient reached a predetermined concentration (5000 ppm) under vacuum, to obtain a transparent epoxy resin composition containing the rubbery polymer particles (A). The time required for evaporation was 5 hours and 20 min. As a result of observing the dispersed state of the rubbery polymer particles (A) in the cured product obtained from the epoxy resin composition, it was confirmed that the rubbery polymer particles (A) were coagulated) across the whole cured product.

COMPARATIVE EXAMPLE 3

Dispersibility of Polymer Particles in Resin Composition in a Case of Directly Mixing Latex To a 1-L volume vessel of 100 mm inner diameter equipped with a jacket and a agitator(the agitator provided with an anchor blade having a 90 mm blade diameter), 150 g of the aqueous latex of the rubbery polymer particles (A) of Production Example 1 was charged, 121 g of an epoxy resin (Epicoat 828 manufactured by Japan Epoxy Resins Co.) was added and mixed uniformly. Then, the jacket temperature (warm water) was set to 60° C., and evaporation was continued by using a vacuum pump, till the volatile ingredient reached a predetermined concentration (5000 ppm) under vacuum, to obtain a epoxy resin composition containing the rubbery polymer particles (A). Since a great amount of water content remained, it took 11 hours and 40 min for the removal of volatile ingredients by evaporation. As a result of observing the dispersion state of the rubbery polymer particles (A) in the cured product obtained from the epoxy resin composition, it was confirmed that the rubbery polymer particles (A) were coagulated across the whole cured product.

COMPARATIVE EXAMPLE 4

Removal of Impurities in Latex Using Organic Solvent

To an 1-liter volume vessel of 100 mm inner diameter equipped with an agitator(the agitator with flat 4-blade impeller having a 75 mm blade diameter were installed for 3 stages in the axial direction), 500 g of methyl ethyl ketone was charged, and 126 g of the aqueous latex of the rubbery polymer particles (A) obtained in Production Example 1 was charged under mixing at 100 rpm. After mixing uniformly, they were stood still for 16 hours to obtain a liquid mixture in a state separated into two phases of 590 g of an upper phase (water containing methyl ethyl ketone) and 36 g of a lower phase (aqueous phase). As a result of sampling the upper phase and measuring remaining emulsifier and electrolyte, the removal ratio was 18% and 14% respectively.

COMPARATIVE EXAMPLE 5

Dispersibility of Polymer Particles in Resin Composition in a Case of Using Organic Solvent To a 1-L vessel of 100 mm inner diameter equipped with jacket and agitator(the agitator provided with an anchor impeller having a 90 mm blade diameter), 590 g of the organic phase (upper phase, methyl ethyl ketone phase) obtained in Comparative Example 4 was transferred and 97 g of an epoxy resin (Epicoat 828 manufactured by Japan Epoxy Resins Co. Ltd.) was added and mixed uniformly. Then, the jacket temperature (warm water) was set to 60° C., and evaporation was continued by using a vacuum pump, till the volatile ingredient reached a predetermined concentration (5000 ppm) under vacuum, to obtain a transparent epoxy resin composition containing the rubbery polymer particles (A). The time required for evaporation was 8 hours and 50 min. As a result of observing the dispersed state of the rubbery polymer particles (A) in the cured product obtained from the epoxy resin composition, it was confirmed that the rubbery polymer particles were coagulated in a portion of the cured product.

COMPARATIVE EXAMPLE 6

Removal of Impurities in Latex Using Organic Solvent and Electrolyte

To an 1-liter volume vessel of 100 mm inner diameter equipped with an agitator (the agitator with flat 4-blade impeller having a 75 mm blade diameter were installed for 3 stages in the axial direction) kept at 25° C., 340 g of methyl ethyl ketone was added, and 252 g of the aqueous latex of the rubbery polymer particles (A) of Production Example 1 was charged under mixing. After mixing uniformly, 126 g of water was charged, 30 g of 5% aqueous solution of sodium sulfate was added under mixing, the organic phase and the aqueous phase were separated and then the aqueous phase was discharged. As a result of sampling the obtained aqueous phase and measuring the remaining emulsifier and the electrolyte, the removal ratio was 60% and 35% respectively.

Further, after mixing the organic phase with 204 g of an epoxy resin, the volatile ingredient was removed by evaporation under vacuum till it reached a predetermined concentration of 5000 ppm, to obtain an epoxy resin composition containing rubbery polymer particles (A). The time required for evaporation was 9 hours and 10 min. As a result of observing the dispersed state of the rubbery polymer particles in the cured product obtained from the epoxy resin composition, they were uniformly dispersed with no coagulation.

EXAMPLE 5

Turbine blades each of 50 mm blade diameter were installed by four stages to a vertical 1-L mixing vessel with 70 mm vessel diameter and 350 mm height and mixing was effected at 450 rpm. Successively, a mixture (C) formed by mixing the aqueous latex of the rubbery polymer particles (A) of Production Example 1 and methyl ethyl ketone (B) each in an equal weight was supplied at a position 50 mm above the bottom of the mixing vessel at a feed rate of 128 ml/min. Simultaneously, water (D) was supplied from another supply port disposed at an identical height above the bottom of the stirring vessel at a feed rate of 92 ml/min. The mixing ratio for the aqueous latex of the rubbery polymer particles (A), methyl ethyl ketone (B) and water (D) was 100 parts by weight, 100 parts by weight and 160 parts by weight, and the mean residence time in the mixing vessel was 4.5 min. The height from the bottom to the liquid surface of the mixing vessel was 300 mm. A slurry comprising the flocculate (F) and the aqueous phase (E) was collected by overflow at a position for the liquid surface in the upper portion of the mixing vessel. Operation was carried out for 10 min to flocculate 580 g of the aqueous latex of the rubbery polymer particles (A). Liquid was removed from the obtained slurry, and methyl ethyl ketone was added to the flocculate (F) to prepare a dispersion (G), and the remaining emulsifier and electrolyte were measured. Removal ratio was 95% and 90% respectively, and the quality was good.

EXAMPLE 6

136 g of methyl ethyl ketone was added to 94 g of the flocculate (F) obtained in Example 5, and mixed for 30 min under the mixing condition at 500 rpm to obtain a dispersion (G) in which the rubbery polymer particles (A) were uniformly dispersed. The dispersion was transferred to a 1-L vessel of 100 mm inner diameter with a jacket and an agitator (the agitator provided with an anchor blade having a 90 mm blade diameter) and 92 g of an epoxy resin (Epicoat 828 manufactured by Japan Epoxy Resins Co. LTD.) was added and mixed uniformly. Then, the jacket temperature (warm water) was set to 60° C., and evaporation was continued by using a vacuum pump (oil-sealed rotary vacuum pump, TSW-150 manufactured by Sato Vac. Inc.), till the volatile ingredient reached a predetermined concentration (5000 ppm) under vacuum, to obtain a transparent epoxy resin composition containing the rubbery polymer particles (A). As a result of measuring the dispersed state of the rubbery polymer particles (A) in the cured product obtained from the epoxy resin composition, they were uniformly dispersed with no flocculation.

EXAMPLE 7

The same procedures as those in Example 5 were carried out except for changing the amount of water (D) supplied to 106 ml/min, 184 parts by weight. The mean residence time in the vessel was 4.3 min. A dispersion (G) was prepared by adding methyl ethyl ketone to a portion of the flocculate (F) collected by overflow from the position at the liquid surface in the upper portion of the mixing vessel and the remaining emulsifier and electrolyte were measured. The removal ratio was 90% and 80% respectively and the quality was good.

EXAMPLE 8

The same procedures as those in Example 6 were carried out except for using the flocculate (F) obtained in Example 7 to obtain an epoxy resin composition containing rubbery polymer particles (A). As a result of observing the dispersed state of the rubbery polymer particles obtained from the epoxy resin composition, the rubbery polymer particles were uniformly dispersed without coagulation.

EXAMPLE 9

The flocculate obtained in Example 7 was dried by a dryer at 70° C. for 2 hours. As a result, a dry powder with a volume average particle size of about 800 μm was obtained.

EXAMPLE 10

To a 1-L vessel of 100 mm inner diameter equipped with an agitator (the agitator with pfaudller impeller having a 56 mm blade diameter were installed), 144 g of methyl ethyl ketone was charged, and 144 g of an aqueous latex of rubbery polymer particles (A) obtained in Production Example 1 was charged under mixing at 400 rpm, and mixed uniformly. The liquid volume was 530 ml. After introducing 207 g of water slowly from the draining port in a lower part of the vessel in a state of stopping the mixing, mixing was effected for 4.5 min under mixing at 400 rpm. After completing the mixing, a slurry comprising a floating flocculate (F) and an aqueous phase (E) containing the organic solvent was obtained. It took about 12 min to obtain the slurry from the start of supplying the raw material.

A portion of the obtained flocculate was sampled and methyl ethyl ketone was added to prepare a dispersion, and the remaining emulsifier and electrolyte were measured. As a result, the removal ratio was 92% and 85% respectively, showing no significant difference in view of the quality, compared with Example 5 in which flocculation was carried out by continuous operation.

EXAMPLE 11

The same procedures as those in Example 6 were carried out except for using the flocculate obtained in Example 10 to obtain an epoxy resin composition containing rubbery polymer particles (A). As a result of observing the dispersed state of the rubbery polymer particles (A) obtained from the epoxy resin composition, the rubbery polymer particles (A) were uniformly dispersed without coagulation, to provide quality comparable with that of Example 6 or 8.

INDUSTRIAL APPLICABILITY

According to the process of the invention, refined rubbery polymer particles can be produced by an easy method of obtaining a loose flocculate from rubbery polymer particles obtained in a state of the aqueous latex in the presence of the organic solvent without using a coagulant, and efficiently discharging impurities to the side of the aqueous phase. Further, since the flocculate can be continuously collected by mixing and contacting a mixture of an aqueous latex and an organic solvent and water continuously, the production efficiently is high and the cost of the equipment can be suppressed.

Further, since the obtained loose flocculate has reversibility, when it is re-dispersed in the organic solvent and then mixed with the polymerizable organic compound or the like, rubbery polymer particles can be uniformly mixed and dispersed in the polymerizable compound. That is, a resin composition with remarkably decreased impurities such as the emulsifier and electrolyte derived from the polymer particles can be produced.

The invention claimed is:

1. A process for producing refined rubbery polymer particles (A) comprising: bringing water (D) into contact with a mixture (C) obtained by mixing an aqueous latex of the rubbery polymer particles (A) with an organic solvent (B) exhibiting partial solubility to water; thereby forming a flocculate (F) of the rubbery polymer particles (A) containing the organic solvent (B) in an aqueous phase (E); and then separating the flocculate (F).

2. The process according to claim 1, wherein water (D) is continuously mixed and brought into contact with mixture (C).

3. The process according to claim 2, wherein the mixture (C) and the water (D) are supplied from the bottom of the mixing device and the mixture of the flocculate (F) and the aqueous phase (E) is recovered from an upper part of the mixing device.

4. A process for producing refined rubbery polymer particles (A), comprising: removing water and/or removing solvent from the flocculate (F) of the refined rubbery polymer particles (A) obtained by the process according to any one of the claims 1 to 3, followed by drying.

5. A process for producing a dispersion (G), comprising: adding an organic solvent exhibiting an affinity with the rubbery polymer particles (A) to the flocculate (F) of refined rubbery polymer particles (A) obtained by the production process according to any one of claims 1 to 3, thereby obtaining the dispersion (G) in which the rubbery polymer particles (A) are dispersed in the organic solvent.

6. A process for producing a resin composition comprising rubbery polymer particles (A) dispersed in a polymerizable organic compound (H) having a reactive functional group, comprising: mixing the dispersion (G) obtained by the production process according to claim 5 and the polymerizable organic compound (H) and then removing the volatile ingredient by evaporation.

7. A process for producing a resin composition comprising rubbery polymer particles (A) dispersed in a polymerizable organic compound (H) having a reactive functional group, comprising: mixing the flocculate (F) obtained by the process according to any one of claims 1 to 3 and the polymerizable organic compound (H) and then removing the volatile ingredient by evaporation.

8. The process for a resin composition according to claim 6, wherein the polymerizable organic compound (H) having the reactive functional group is an epoxy resin.

9. The process according to any one of claims 1 to 3, wherein the solubility to water at 20 C of the organic solvent (B) exhibiting a partial solubility to water is 5% by weight or more and 40% by weight or less.

10. The process according to any one of claims 1 to 3, wherein the amount of water (D) to be brought into contact with the mixture (C) obtained by mixing the aqueous latex of the rubbery polymer particles (A) with the organic solvent (B) exhibiting the partial solubility to water is 40 parts by weight or more and 350 parts by weight or less based on 100 parts by weight of the organic solvent (B).

11. The process according to any one of claims 1 to 3, wherein the ratio of the organic solvent (B) exhibiting the partial solubility to water contained in the flocculate (F) is 30% by weight or more based on the entire weight of the flocculate (F).

12. The process according to any one of claims 1 to 3, wherein the rubbery polymer particles (A) comprise a polymer having a two or more multi-layered structure and contain at least one layer of cross-linked rubbery polymer layer.

13. The process according to any one of claims 1 to 3, wherein the rubbery polymer particles (A) comprise a graft copolymer having 5 to 60% by weight of a shell layer (A-2) obtained by polymerizing at least one vinyl polymerizable monomer selected from (meth)acrylate ester, aromatic vinyl, vinyl cyanate, unsaturated acid derivative, (meth)acrylamide derivative and maleimide derivative in the presence of 40 to 95% by weight of a rubber particle core (A-1) comprising an elastomeric material constituted with 50 to 100% by weight of at least one monomer selected from diene monomer and (meth)acrylate ester monomer, and 0 to 50% by weight of other copolymerizable vinyl monomer, a polysiloxane elastomeric material or a mixture thereof.

14. The process according to claim 13, wherein the shell layer (A-2) of the rubbery polymer particles (A) has at least one reactive functional group selected from the group consisting of epoxy group, carboxylic group, hydroxylic group and carbon-to-carbon double bond.

15. The process for a resin composition according to claim 7, wherein the polymerizable organic compound (H) having the reactive functional group is an epoxy resin.

* * * * *